Jan. 14, 1958 F. H. KAYLER 2,819,913
SPRING MOUNTED AIR CONNECTOR COUPLING
Filed March 9, 1953 2 Sheets-Sheet 1
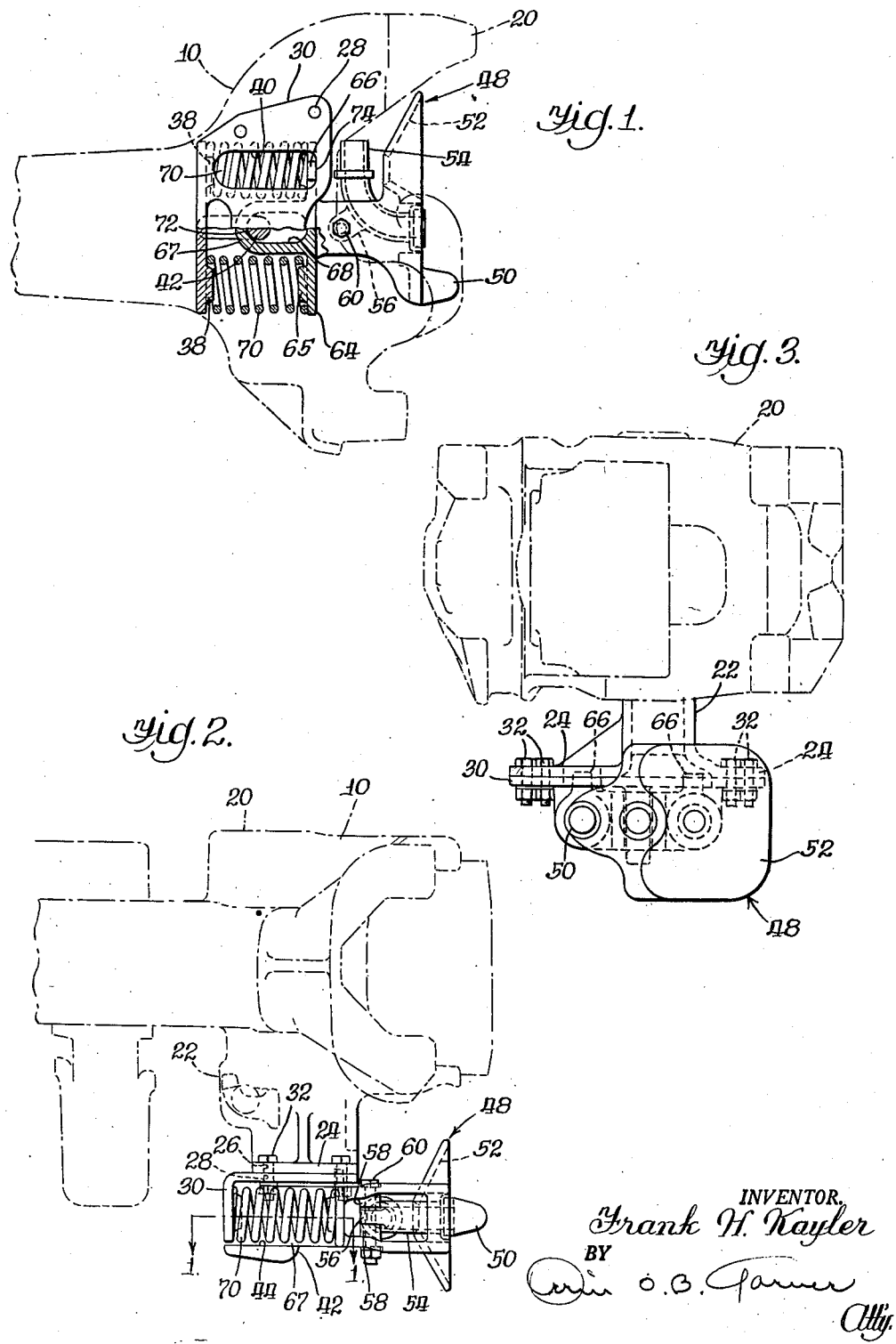
INVENTOR.
Frank H. Kayler
BY Jan. 14, 1958 F. H. KAYLER 2,819,913
SPRING MOUNTED AIR CONNECTOR COUPLING
Filed March 9, 1953 2 Sheets-Sheet 2
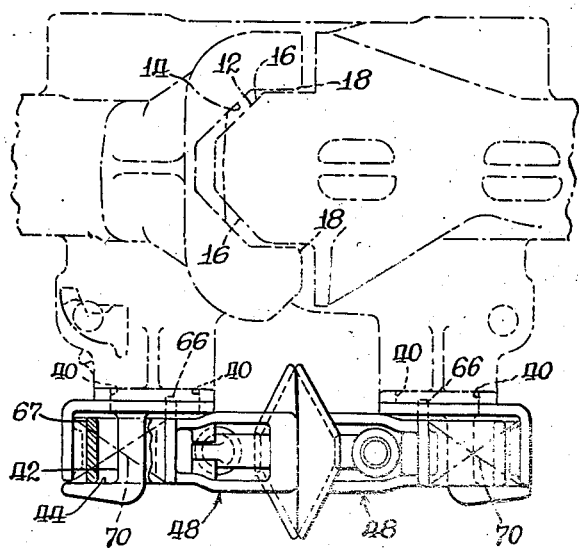
Fig. 4.
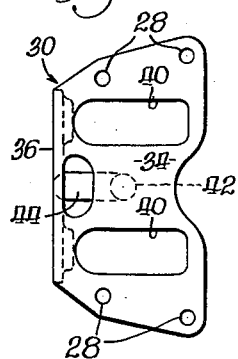
Fig. 5.
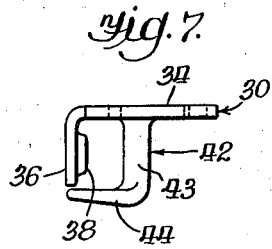
Fig. 6.
Fig. 7.
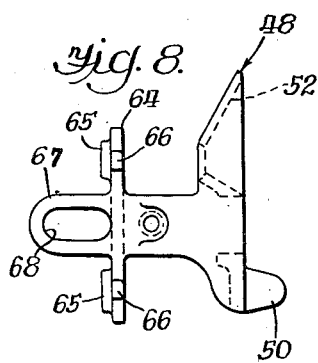
Fig. 8.
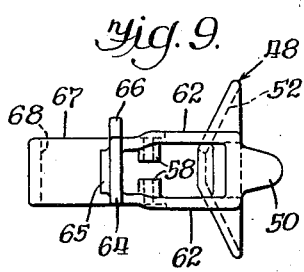
Fig. 9.
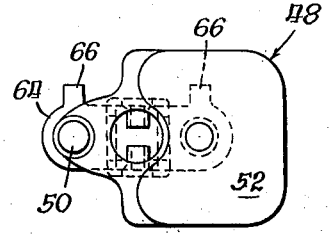
Fig. 10.
INVENTOR.
Frank H. Kayler
BY

United States Patent Office 2,819,913
Patented Jan. 14, 1958

2,819,913

SPRING MOUNTED AIR CONNECTOR COUPLING

Frank H. Kayler, Alliance, Ohio, assignor to American Steel Foundries, Chicago, Ill., a corporation of New Jersey Application March 9, 1953, Serial No. 341,049

14 Claims. (Cl. 285—63)

This invention relates to vertically interlocking couplers and more particularly to a novel air connector and mounting therefor.

As will be understood by those skilled in the art, couplers of the vertically interlocked type are supported from the car by spring type carriers which extend considerably below the coupler shank immediately rearwardly of the coupler head. Air connector mountings heretofore utilized in the art extend considerably rearwardly of the coupler head, consequently, cannot be applied to couplers having spring type carrier supports.

Considering the above, it is an object of my invention to provide a vertically interlocking coupler with a novel air connector mounting so compact as to offer support for an associated air connector entirely within the plan dimensions of the coupler head.

It will also be understood that when automatic air connectors were originally conceived the couplers to which they were applied were of the non-interlocking type and consequently had to be designed to afford great latitude in vertical angling in order to permit their movement with their related coupler. However, with the advent of modern vertically interlocking couplers, wherein the vertical shifting between mated couplers is nominal, the freedom for vertical angling between mated air connectors is neither advantageous nor desired. On the contrary, it is desired to prevent vertical angling between mated air connectors in order to insure more rigid connections and lessen the chance of air leakages therebetween.

Accordingly, it is another object of this invention to provide an air connector mounting arrangement especially adapted for application to vertically interlocking couplers, wherein freedom for vertical angling between mated couplers is greatly restricted.

It is a further object of my invention to provide a mounting of the type described having the advantages of simplicity and ruggedness with the consequent ease of manufacture and satisfactory service life.

These and other objects of my invention will become apparent in the course of the following description and from an examination of the concerned drawings, wherein:

Figure 1 is a plan view of the assembled air connector and mounting with a coupler shown in phantom superimposed thereon and with a partial section taken approximately along line 1—1 of Figure 2;

Figure 2 is a side elevational view of the showing of Figure 1;

Figure 3 is an end elevational view, taken from the right, of the showing of Figure 2;

Figure 4 is a side elevational view showing the couplers and air connectors in fully locked operational position;

Figures 5, 6 and 7 are respectively plan, rear and side detail views of the connector bracket employed in my novel mounting; and Figures 8, 9 and 10 are respectively plan, side and front detail views of the air connector casting employed in my novel arrangement.

Describing the invention in detail, it will be seen that the coupler employed and indicated generally in phantom lines at 10 is of the conventional type having a tongue 12 (Figure 4) on one portion of the operating coupler received within a recess 14 on the other portion of the operating coupler, thereby limiting vertical movement between said portions and furnishing the vertical interlocked feature mentioned. It will be noted that the tongue 12 has tapered cam surfaces 16, 16 which, during the coupling operation, may engage the forward recess edges 18, 18 and thereby horizontally align the respective coupler portions.

Directing attention to Figures 1 and 2, it will be seen that the coupler head 20 is provided with an integral lug 22 depending from its lower side, said lug having horizontal flanges 24, 24 extending from the opposite sides thereof. Flanges 24 may be provided with holes 26, which in the assembled condition, are aligned with other holes 28 presented by a connector bracket 30, whereby said bracket may be rigidly bolted to the flange by means of bolts 32. It will be noted that though the bolted connection illustrated is preferred, any reasonable means of securing the bracket to the flange may be employed.

Referring to Figures 5 to 7, it will be seen that the connector bracket 30 comprises a main plate 34 and a spring seat plate 36, said spring seat plate being integral with and perpendicular to one edge of the main plate 34, and presenting on its inboard surface a pair of spring seat bosses 38, 38 arranged equidistant from and on opposite sides of the center line of the bracket. The main plate 34 presents the elongated slots 40, 40 disposed on opposite sides of the center line of the bracket, each slot having its long axis directionally aligned longitudinally of the bracket. Centrally of the main plate, a trunnion 42 is formed to depend therefrom, said trunnion comprising a main cylindrical segment 43 and a shelf or support arm 44 connected to the lower extremity thereof and directed rearwardly of the bracket. As noted, the shelf 44 extends rearwardly of the bracket and terminates at a point approximately aligned with the spring seat plate 36, said spring plate 36 having a recess 46 in the area of said termination thereby providing clearance from assembly and disassembly of the unit.

Attention is now directed to Figures 8 to 10 wherein is illustrated the preferred form of an air cast connector member 48 utilized in my invention. The forward or air connecting head of the casting is a conventional pin and funnel type, the pin being shown at 50 and the funnel at 52. As will be understood by those skilled in the art, the pin is formed to engage a funnel on an associated head, while a pin on the associated head engages the illustrated funnel, the funnel-pin engagement serving to align the respective heads during the connecting or coupling operation. Referring to the assembly views of Figures 1 and 2, it will be seen that an air hose connector 54 is positioned on the casting intermediate the funnel and pin, said air hose connector being provided with a lug 56 which is received intermediate drilled bosses 58, 58 whereby the air hose connector may be securely bolted to the casting 48 as at 60.

Rearwardly of the connection head, the air connector comprises vertically spaced plates 62, 62, the space intermediate said plates affording clearance for the positioning of the air hose connector, as described above. The rear extremities of the plates 62 merge integrally with a spring seat plate 64, said plate 64 extending generally transversely of the plates 62 and parallel to the front face of the connecting head. The spring seat plate also presents generally vertical rearwardly facing spring seats having positioning lugs 65, 65, said lugs or bosses being equidistant from and on opposite sides of the center line of the air connector casting. Atop the spring plate 64 are presented the upwardly directed alignment lugs 66, 66, each lug being vertically aligned with one of the spring seats and the spring positioning bosses 65. Projecting rearwardly of the spring plates 64 and centrally thereof is a mounting arm or loop 67, said arm presenting an elongated slot 68 having its long axis extending lengthwise of the air connector casting and generally perpendicular to the spring plate 64.

To assemble the entire unit, the connector bracket 30 is first bolted to the flanges 24 of the coupler. The air connector casting 48 with the air hose connector 54 mounted thereon is then assembled with the mounting arm 67, seated on the shelf 44 and the trunnion 42 received within the elongated slot 68 of said arm. Helical coil springs 70, 70 are then compressed and positioned on opposite sides of the longitudinal axis of the unit, each of said springs having its opposite ends seated on the spring seat plates 36 and 64 of the connector bracket and air connector casting, respectively. It will be noted that the positioning lugs 38 and 65 serve to maintain the associated spring ends in mounted position. Referring to Figure 3, it will be seen that the alignment lugs 66 of the casting 48 are respectively received within the slots 40 of the connector bracket 30, operating clearance being provided therefor in the lug 22 depending from the coupler.

In the fully assembled and uncoupled position of the unit, as shown in Figures 1 and 2, it will be seen that the rear edge of the slot 68 is seated in vertical surfaced engagement with the cylindrical portion 43 of the trunnion 42, as shown at 72. It will also be seen that the lugs 66 of the connector casting 48 engage the respective forward edges of the slots 40 of said bracket 30, as at 74. It will also be noted that the respective engagements are the result of the pressured action of the springs 70 on the casting 48 and that the vertical surfaced engagement between the rear edge of the slot 68 and the trunnion 42 serves to maintain the connection head in a given horizontal plane relative to the coupler and that the engagement between the lugs 66 and the forward edges of the slots 40 serves to maintain the connection head in a given vertical plane relative to the coupler. Thus in the uncoupled condition, the air connector unit always maintains a definite position relative to the associated coupler.

Attention is now directed to Figure 4, wherein is illustrated the coupler and air connector unit in the coupled or operating position. It will be noted that engagement of the air connector heads has urged the respective castings 48 rearwardly, moving each mounting arm 67 rearwardly on the associated guide shelf 44 and disengaging the rear edge of the slot 68 from the cylindrical portion 43 of the trunnion 42. It will also be noted that the lugs 66 have disengaged and moved rearwardly of the forward edges of the slots 40.

In this position, slight horizontal angling normally incident to the connected coupler heads 10 is readily accommodated by pivotal movement of the air connector castings 48 about the trunnions 42, the springs 70 serving to maintain a tight air sealing connection between the respective units.

Because couplers of the general type described are designed to eliminate relative vertical movement, the connector units need only accommodate limited vertical angling, which is readily accomplished with the arrangement described.

Because of the rearward movement of the castings 48 in the coupled position, considerable wear in the main coupler heads will be accommodated and the air connector, under the action of the respective springs 70, will still maintain a tight sealing engagement.

I claim:

1. In a mounting arrangement for an air connector unit associated with a coupler of the interlocking type and adapted for interlocking engagement with a similar unit on another coupler, a bracket rigidly secured to the coupler head, a trunnion on the bracket, a casting having air connection means thereon, a mounting arm projecting from the casting and engageable with said trunnion, spring means compressively interposed directly between the casting and the bracket, said spring means being operative to act on said casting and bring said arm into line engagement with said trunnion, said bracket and mounting arm having substantial length in direction longitudinally of the mounting arm in mutual engagement, whereby said connection means is maintained in a predetermined plane relative to the coupler and vertical angling between the casting and bracket is restricted, and means to maintain said connection means in another predetermined plane relative to the coupler in response to action of said spring means.

2. In a mounting arrangement for an air connector unit associated with a coupler of the interlocking type and adapted to cooperatively engage a similar unit on a mating coupler, a mounting bracket having a trunnion, means to connect said bracket to the coupler, a connector member slidably mounted on said bracket and having air connection means thereon, a mounting arm on the connector member having an elongated slot therein receiving said trunnion in a linearly movable manner, and means reacting directly between said bracket and casting and urging said slot into line surfaced engagement with said trunnion, said bracket and mounting arm having substantial length in direction longitudinally of the mounting arm and in mutual engagement, whereby said casting is maintained in a predetermined plane relative to the coupler and vertical angling between the casting and bracket is restricted.

3. A mounting arrangement as described in claim 2, and including means associated with said casting and having portions spaced transversely of the longitudinal direction of the mounting arm to maintain same in another predetermined plane relative to the coupler.

4. In a mounting arrangement for an air connector unit associated with a coupler of the interlocking type and adapted to cooperatively engage a similarly constructed unit on a mating coupler, a mounting bracket secured to the coupler, a casting mounted for reciprocative movement on said bracket and having air connection means thereon, spring means directly engaging and reacting directly between and yieldably resisting relative movement of the bracket and casting, interengaging means on the casting and bracket operative in the uncoupled position of the unit to maintain said casting in a fixed plane relative to the coupler, and other interengaging means on the casting and the coupler and having portions spaced transversely of the direction of movement between the casting and bracket operative in the uncoupled position of said unit to maintain said casting in a fixed plane relative to the coupler, said last mentioned plane being perpendicular to said first mentioned plane.

5. A mounting arrangement as described in claim 3, wherein said second mentioned interengaging means comprises lugs on the casting on opposite sides of said unit, said lugs being received within slots in the bracket and engageable with edges of the slots.

6. A mounting bracket for use with an air connector mounting arrangement of the type described, comprising a flat main plate, a spring seat plate integral with and normal to the main plate, a trunnion rigid on and depending from the main plate approximately centrally thereof, and a shelf integral with the lower end of the trunnion and extending toward and terminating adjacent the spring seat plate, said shelf being approximately parallel to the main plate, said spring seat plate having a cut-out adjacent the terminal end of said shelf.

7. In a mounting arrangement for an automatic air connector unit usable with a railway car coupler and engageable with a corresponding unit on a mating coupler, a bracket attachable to the coupler, said bracket having a trunnion projecting therefrom, spring seats integral with and projecting from the bracket in spaced relation to the trunnion, said spring seats being disposed on opposite sides of said trunnion, a casting having a loop section extending from one side thereof slidably engaging said bracket for linear and pivotal movement in a single plane, said loop section having an aperture therein receiving said trunnion, said loop section being substantially equivalent in vertical dimension to the trunnion and engaging the bracket throughout a substantial distance longitudinally of the bracket, spring seats on the casting aligned with the first mentioned spring seats, respectively, and springs compressively engaging the spring seats of the casting and bracket, respectively to maintain said trunnion in line contact with the loop section of the casting to restrict vertical angling between the casting and the bracket.

8. An air connector mounting arrangement for a railway car coupler of the interlocking type adapted to interlockingly engage a similar arrangement on a mating coupler to provide an air tight connection therebetween, a mounting lug secured to the coupler, a connector bracket rigidly secured to the lug, spring seats rigidly secured to and depending from the bracket, a trunnion connected to the bracket intermediate said seats, said trunnion having on an extremity a shelf, an air connector casting having a pin and funnel connection means, a mounting arm on the casting and slidably supported on said shelf and having an elongated slot receiving said trunnion whereby said casting is supported for linear and pivotal movement in a single plane, spring seats presented by said casting on either side of said arm, said last mentioned spring seats being aligned with said first mentioned spring seats, coiled springs compressively interposed between said spring seats on opposite sides of said trunnion and arm, said springs and pin and funnel means having coplanar axes, and alignment lugs projecting from said casting and received by elongated slots in said connector bracket, said springs being operative to exert pressure on said casting whereby the slot in said arm is brought into line engagement with said trunnion and the alignment lugs on said casting are brought into engagement with the edges of said receiving slots to restrict vertical angling between the bracket and the casting, said mounting arm having a vertical dimension substantially equivalent to the distance between the shelf and upper end of the trunnion.

9. An air connector mounting arrangement for a railway car coupler of the interlocking type adapted to cooperatively engage a similar unit on a mating coupler, a connector bracket rigidly mounted on the coupler, said bracket including a transverse horizontal plate and a vertical plate depending therefrom at a rear edge, said horizontal plate having a depending trunnion with a horizontal shelf at its lower end extending toward said vertical plate, and a casting having air line connection means mounted thereon, said casting having a transverse vertical plate and a mounting arm with an aperture receiving said trunnion and resting on said shelf, said mounting arm having a vertical dimension substantially equivalent to the spacing between said shelf and horizontal plate, and compression springs interposed between said vertical plates.

10. An air connector mounting arrangement for a railway car coupler of the interlocking type adapted to cooperatively engage a similar unit on a mating coupler, a connector bracket rigidly mounted on the coupler, said bracket including a transverse horizontal plate and a vertical plate depending therefrom at a rear edge, said horizontal plate having a depending trunnion with a horizontal shelf at its lower end extending toward said vertical plate, said horizontal plate also having front-rear extending slots on opposite sides of said trunnion, and a casting having air line connection means mounted thereon, said casting having a transverse vertical plate and a mounting arm with an aperture receiving said trunnion and resting on said shelf, said mounting arm having a vertical dimension substantially equivalent to the spacing between said shelf and horizontal plate, and compression springs interposed between said vertical plates, said transverse vertical plate on the casting having lugs extending into and riding in said slots.

11. An air connector mounting arrangement for a railway car coupler of the inetrlocking type adapted to cooperatively engage a similar unit on a mating coupler, a connector bracket rigidly mounted on the coupler, said bracket including a transverse horizontal plate and a vertical plate depending therefrom at a rear edge, said horizontal plate having a depending trunnion with a horizontal shelf at its lower end extending toward said vertical plate, and terminating approximately in the plane of the plate, and a casting having air line connection means mounted thereon, said casting having spring seat means aligned with transversely spaced portions of said vertical plate, said casting also having a mounting arm with an aperture receiving said trunnion and resting on said shelf, said vertical plate having a central cutout portion for accommodating said mounting arm when fitting the latter on said shelf, and compression spring means interposed between said vertical plate and said seats on said casting.

12. A mounting arrangement according to claim 14, wherein said abutment means comprises upstanding lugs on the connector member, said lugs being received by slots in the bracket and being engageable with ends of said slots.

13. An air connector member for use with an air connector mounting arrangement of the type described comprising forwardly facing connection means, a rearwardly extending mounting loop having a substantial vertical forwardly facing cylindrical surface for engagement with a trunnion of the air connector, rearwardly facing spring seats, and lugs upstanding from the connector member disposed on opposite sides of and normal to the plane of said loop.

14. In a mounting arrangement for an air connector associated with a car coupler adapted to cooperatively engage a similar unit on a mating coupler and provide an air tight connection therebetween, a bracket rigidly secured to the coupler entirely within the confines of the coupler head as seen in plan view, forwardly facing spring seats on the bracket disposed on opposite sides of the longitudinal vertical center plane of said coupler, a connector member mounted for linear and pivotal movement in a single plane on the bracket and having forwardly facing air connection means, spring seats on the connector member aligned longitudinally with the first mentioned spring seats, springs interposed between the spring seats and operative to urge the connector member forwardly from said bracket, means interconnecting the connector member and the bracket operable to maintain the connector member substantially in said plane during linear movement, and abutment means on the connector member engaging the bracket and operable to maintain the connector member substantially in a fixed plane perpendicular to the first mentioned plane when in the normal position, said interconnecting means comprising a cylindrical trunnion vertically depending from the bracket, and a mounting arm connected to the connector member, said arm embracing said trunnion and operative to engage same in response to action of said springs, and means on said trunnion cooperating with another fixed portion of the connector member for maintaining said connector member substantially in said first mentioned plane.

References Cited in the file of this patent

UNITED STATES PATENTS

| | | |
|---|---|---|
| 846,841 | Forsyth | Mar. 12, 1907 |
| 1,519,184 | Barber | Dec. 16, 1924 |
| 1,564,999 | Barber | Dec. 8, 1925 |
| 1,643,229 | Sullivan | Sept. 20, 1927 |
| 1,692,657 | Haseltine | Nov. 20, 1928 |
| 2,165,330 | Bazeley | July 11, 1939 |
| 2,231,028 | Robinson | Feb. 11, 1941 |